United States Patent [19]

Ingemann

[11] 4,207,989
[45] Jun. 17, 1980

[54] CONTAINER WITH LID OPENING MEANS
[75] Inventor: Ole Ingemann, Svendborg, Denmark
[73] Assignee: A/S Haustrup Plastic, Langeskov, Denmark
[21] Appl. No.: 958,502
[22] Filed: Nov. 7, 1978
[30] Foreign Application Priority Data
Nov. 17, 1977 [SE] Sweden .............................. 7712987
[51] Int. Cl.² .............................................. B65D 41/32
[52] U.S. Cl. .................................. 220/266; 220/270; 220/359; 229/43
[58] Field of Search ...................... 220/359, 266–270; 229/43; 150/0.5

[56] References Cited
U.S. PATENT DOCUMENTS
3,276,616 10/1966 Lurie ................................ 220/359 X Primary Examiner—George T. Hall
Attorney, Agent, or Firm—Hane, Roberts, Spiecens & Cohen

[57] ABSTRACT

A container and lid combination in which the lid is removable from the container to open the container and it is replaceable to close the container. The container has a body with a mouth including a strip of annular extent secured to the lid. The body has an annular weakening notch in the vicinity of the strip and the container is separable at the notch to separate a part of the container mouth and the lid together with the strip from the body of the container. The notch is positioned radially inwards of the strip and upon rupture of the notch separate parts are formed which can be reengaged upon replacement of the lid on the container. Locating surfaces are provided on the lid and container for establishing a determined oriented position of replacement of the lid on the body of the container.

5 Claims, 37 Drawing Figures

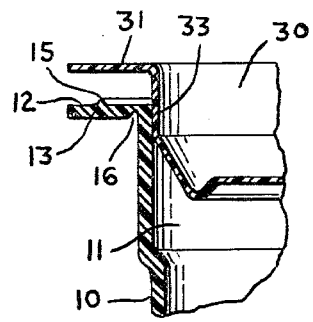
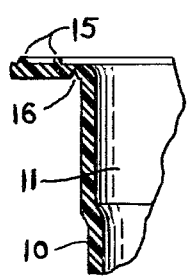
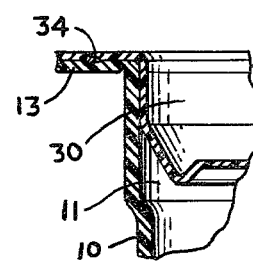
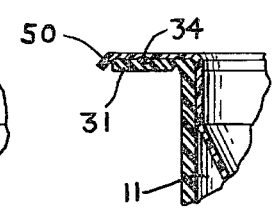
FIG.1a    FIG.1b    FIG.2a    FIG.2b
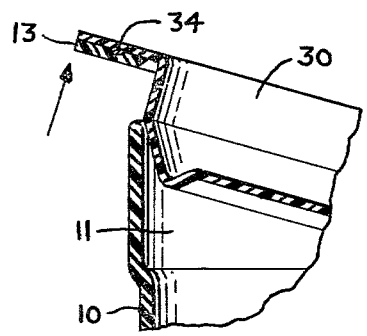
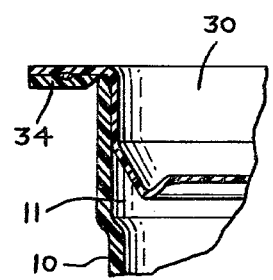
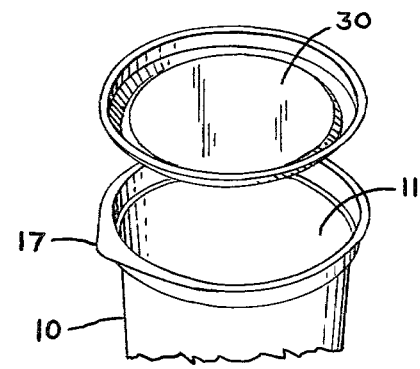
FIG.3    FIG.4    FIG.5
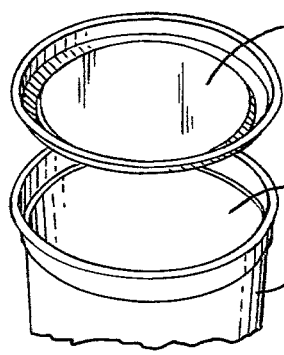
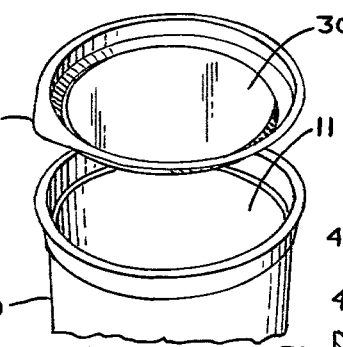
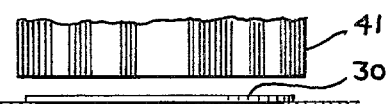
FIG.6    FIG.7    FIG.8
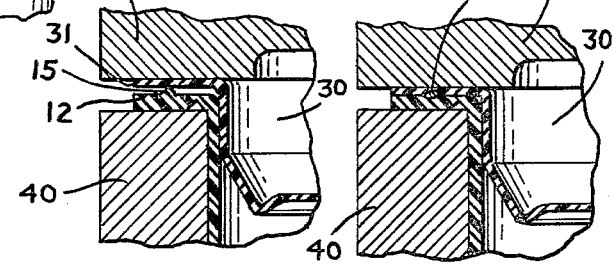
FIG.9    FIG.10
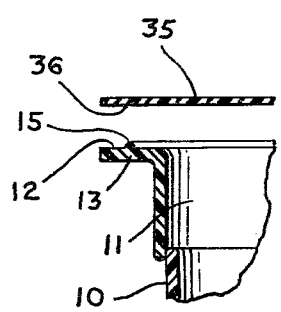
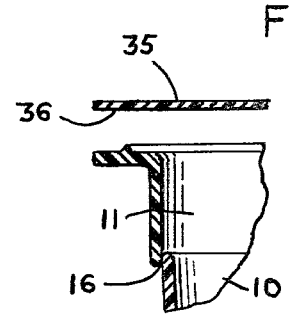
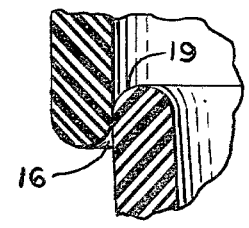
FIG.11    FIG.12    FIG.13

CONTAINER WITH LID OPENING MEANS

FIELD OF THE INVENTION

This invention relates to a container with lid, where the opened container can be reclosed since the lid is designed as a snap-on device. Further, the lid is arranged so as to provide a sealed closure with the container. The sealed closure is obtained by the lid being designed with a ring-shaped edge section for interacting with a ring-shaped outer section of the opening edge of the container. In a filled originally-closed container, the lid is fixed to the ring-shaped outer section of the opening edge, e.g. by welding or bonding. Arranged inside the container is a ring-shaped weakened section, the weakened section being situated in an area extending from the area for fixing the ring-shaped edge section of the lid and continuing partway down the container body. On opening the container, the connection in the ring-shaped weakened section is broken so that the lid and ring-shaped outer sections attached to the lid and possibly also the top part of the former container body are separated from the actual container.

BACKGROUND

Containers of this type can be used as beaker-shaped or box-shaped packagings for milk, butter, margarine and similar commodities. Such containers may be of different height and shape and can, for example, be round, rectangular or oval. In certain applications, containers of extremely flat design also occur such as plates or bowls for pre-cooked meals. In these versions the container has an extremely wide opening which is closed by means of a large flat lid. There is an extremely strong need to be able to ensure that a container of the above-mentioned type, once it has been filled and sealed, cannot be unauthorizedly opened fully or partially without it being noticed by the end user of the contents of the packaging. Particularly in connection with thin-wall thermoplastic containers, difficulty is experienced with presently-known techniques in ensuring this as in such designs it is not possible to arrange a secure form of sealing.

The problems have been solved as regards containers for disposable use since on such containers the opening is covered by a foil lid of plastic, for example, or by a plastic-metal compound foil which is positioned and sealed to the edge of the opening. When opening such a filled originally-closed container the lid foil is torn off, which precludes re-use of the lid for closing the container.

SUMMARY OF THE INVENTION

This invention is directed to a container with a snap-on lid in which security against undetected breaking of the original closure is combined with a means for reclosing the container.

According to the invention the opening edge of the container is designed with a ring-shaped outer section while the lid has around its circumference, a ring-shaped edge section adapted for placement against the outer section. The outer section of the container and the edge section of the lid are securely fixed to each other such that on opening the originally-closed container the fixing is not broken but opening takes place in a ring-shaped weakened section. This is situated in the container and in an area extending from the area for fixing the lid to the container and partway down the body of the container.

The invention provides the advantage that the user will immediately notice that the commodity is originally-packaged in that a certain degree of resistance is encountered on opening the packaging. Protection against involuntary opening during handling is also achieved hereby, at the same time as the user will immediately notice whether a packaging has been fully or partially opened. Over and above this, a combination of lid and container according to the invention gives the advantage that an opened container can be reclosed many times by means of the snap-on lid.

According to one embodiment of the invention, the tear-off indication is arranged adjacent to the transition between a ring-shaped element which supports the ring-shaped outer section of the container and the actual container body. Hereby the lid is arranged for internal snap fitting into the container. An originally-closed container is thereby securely sealed through the combination of fixing between lid and container which is achieved partly through the fixing between the ring-shaped edge section of the lid and the ring-shaped outer section of the container, and partly through the lid being a snap fit in the container.

In another alternative embodiment of the invention, the tear-off indication is arranged partway down the container body. The container body hereby incorporates a dimensional change adjacent to the tear-off indication so that the dimensions of the container body below the tear-off indication are somewhat smaller than above it. On opening the container, the lid and the upper part of the container body are separated from the rest of the container. After opening, the separated part of the container body comprises a snap-on element for reclosing the container.

According to yet another alternative embodiment of the invention, the ring-shaped outer section of the container is supported by a ring-shaped element. The tear-off indication is situated in the transition between the container body and the ring-shaped element. The ring-shaped element thereby comprises a shearing element to facilitate opening the originally-closed container in the ring-shaped weakened section. The ring-shaped element is thereby designed so that after the container has been opened it comprises a snap-on element for reclosing the container.

In a preferred embodiment of the invention, the ring-shaped edge section of the lid is fixed to the ring-shaped outer section of the container by means of ultrasonic welding. The ring-shaped edge section or the ring-shaped outer section is thereby given a ring-shaped weld indication. On joining the lid and container together, the ring-shaped element of the container is supported by a holding-up tool at the same time as an ultrasonics generator (sonotrod) is applied to the ring-shaped edge section of the lid. Oscillations from the sonotrod are propagated through the lid into the weld indication and cause the lid and the container to be welded together.

Separate opening indications in the form of gripping elements such as tongues or the like can be arranged either adjacent to the ring-shaped edge section of the lid or adjacent to the ring-shaped outer section of the container.

The container can also be arranged with a spout. In the embodiment with a tear-off indication arranged partway down the container body the tear-off indication passes through the spout. In this embodiment the spout is used to facilitate opening the container. Pressure is then applied in an axial direction on the lid above the container spout, whereby the connection in the tear-off indication is broken and opening of the container is commenced.

BRIEF DESCRIPTION OF THE DRAWING

FIG. 1a shows a partial section through the opening part of a container and through a lid situated above it before the lid is fixed to the container, FIG. 1b shows a partial section of the opening part of the container arranged with two weld indications, FIGS. 2a and 2b are partial section of the opening part of a container during opening of the container, FIG. 3 shows a partial section of the opening part of a container during opening of the container, FIG. 4 shows a partial section of the opening part of a container when the container has been reclosed, FIGS. 5–7 are modified embodiments of the container and lid arranged in accordance with FIGS. 1–4, FIGS. 8–10 show an arrangement in principle for fixing the lid to the container by means of ultrasonic welding, FIGS. 11–12 show partial sections of alternative embodiments of the opening part of the container where the tear-off indication of the container is situated partway down the container body, FIG. 13 shows in detail a partial section as in FIG. 12, FIGS. 14–17 show a lid and a container arranged as in FIG. 11 or FIG. 12 in the fixed position (FIG. 14), during opening (FIGS. 15–16) and when reclosed (FIG. 17)

DETAILED DESCRIPTION

Figure 14:
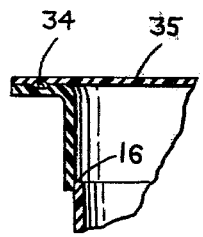
Figure 16:
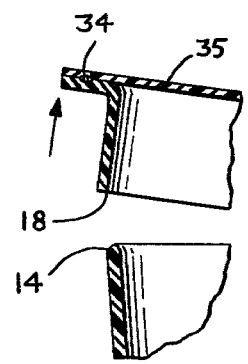

Illustrated in FIGS. 1–6, a container 10 the mouth 11 of which continues into a ring-shaped element 13 is supporting a ring-shaped outer section 12. The ring-shaped outer section is designed with one or more weld indications 15. In the transition between the ring-shaped element and the container body a ring-shaped weakening notch 16 is arranged externally.

Also visible, a lid 30 is arranged with a ring-shaped edge section 31 adapted to the ring-shaped outer section 12 of the container. The lid has a cylindrical section 33 which has a firm fit against the inner surface of the mouth of the container. Shown in FIG. 2b the ring-shaped edge section 31 of the lid is arranged with a down-turned edge 50 to give added rigidity to the ring-shaped edge section. Hereby a certain degree of protection is provided against fracture of the connection in the ring-shaped weakening notch when forces are applied to the ring-shaped edge section of the lid in connection with handling or stacking of the container, for example.

In FIG. 1 the lid 30 is situated above the container 10 while in FIGS. 2a and 2b the lid is fixed to the container by means of bonding or welding. In FIG. 3 a force is applied to the underside of the ring-shaped element 13 of the container whereby the ring-shaped element is separated from the container body at the ring-shaped weakening notch 16. On separation, the lid, together with the ring-shaped element 13, form a combined unit which on reclosing of the container snaps into the mouth of the container in the manner shown in FIG. 4.

In FIG. 5 a gripping element 17 is arranged on the ring-shaped element 13 while in FIG. 7 a gripping element 32 is arranged on the lid 30. In the embodiment shown in FIG. 7 greater strength is required in the fixing between the ring-shaped edge section of the lid and the ring-shaped element of the container than in the embodiment shown in FIG. 5 because the fixing has to resist the tensile forces that arise when the container is opened.

FIG. 6 shows a perspective view of the mouth 11 of the container with a lid 30 situated above the container.

Depicted in FIGS. 8–10 there is a container 10 which rests with its ring-shaped element 13 on a holding-up tool 40. The lid 30 is placed on top of the container. The lid 30 thereby rests on the ring-shaped weld indication 15 (cf. FIG. 9). Above the container with lid there is an ultrasonic generator or sonotrod 41.

On fixing the lid to the container the sonotrod presses the ring-shaped edge section 31 of the lid against the weld indication 15 on the ring-shaped outer section 12 of the container. Ultrasonic oscillations are transmitted via the lid to the weld indication whereby the material in the area of the weld indication is heated so that the lid material is joined to the container material. The situation after welding will be evident from FIG. 10 where the welding area is designated by reference number 34 (cf. also FIGS. 2–4).

Depicted in FIGS. 11–23 there is a flat lid 35. This flat lid consequently has a part 36 adjacent its circumferential surface which corresponds to the ring-shaped section 31 of the lid 30 as shown in FIGS. 1–10. The container also incorporates the mouth 11, the ring-shaped element 13, the ring-shaped outer section 12 and the weld indication 15. The ring-shaped weakening notch 16 is situated partway down the mouth 11. In FIG. 11 the transition between the two sections of the container body that are separated from each other by the ring-shaped weakening notch 16 is comparatively angular while the transition in FIG. 12 is more rounded. The embodiment depicted in FIG. 12 (shown in detail in FIG. 13) facilitates reclosing of the container.

Figure 17:
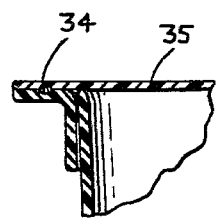
Figure 15:
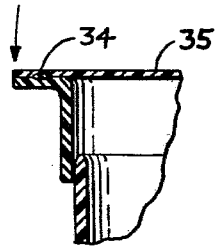

FIGS. 14–17 show an originally-closed container (FIG. 14), a container in the process of being opened (FIGS. 15–16) and a reclosed container (FIG. 17). From FIGS. 14–16 it will be evident that the container is opened by applying to the edge of the container lid an axial pressure directed towards the bottom of the container. The connection in the ring-shaped weakening notch 16 hereby fractures and opening of the container is commenced. Opening can either be continued by applying axial pressure around the edge of the lid or by successively removing the lid through the application of axial pressure to the ring-shaped element 16 in the opposite direction.

From FIG. 17 it will be evident that on reclosing the container the lid snaps over the mouth of the container since that part of the container body accompanying the lid fitted firmly around the mouth of the container. From the drawing it is also evident that on breaking the ring-shaped weakening notch 16 a ring-shaped locating surface 14 is formed to facilitate reclosing of the container. In the embodiment depicted in FIGS. 12–13 the locating surface 14 interacts with the rounded surface of edge 18 on that part of the container body that accompanies the lid when the container is opened. Particularly in the embodiment shown in FIG. 13, the remaining part of the container body, the edge 19 of which forms the mouth of the opened container, is of rounded design which on reclosing the container interacts with the rounded surface of edge 18.

Figure 18:
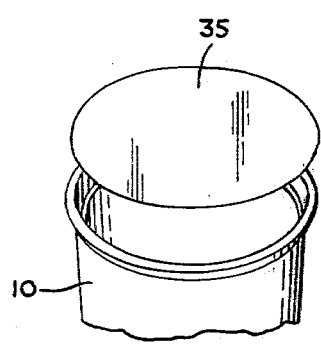
FIGS. 18–23 show embodiments of the container and lid in accordance with the alternative embodiment shown in FIGS. 11–12.
Figure 19:
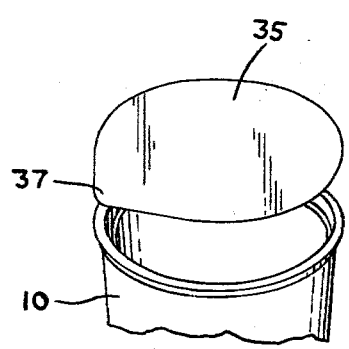
Figure 20:
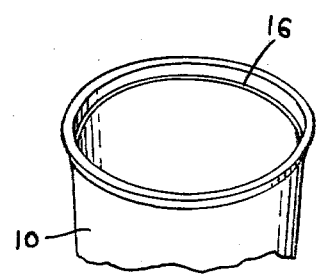

FIG. 18 shows a perspective view of a container 10 with a flat lid 35 situated above it before original closure of the container. FIG. 19 shows the flat lid 35 arranged with a gripping element 37. FIG. 20 shows the mouth 11 of the container with weakening notch 16.

Figure 21:
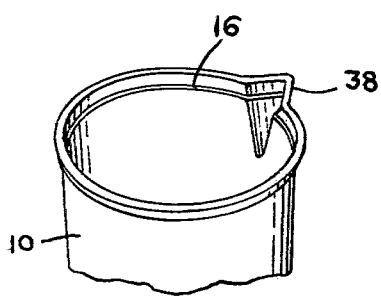
Figure 22:
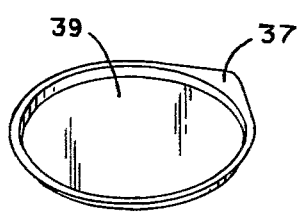
Figure 23:
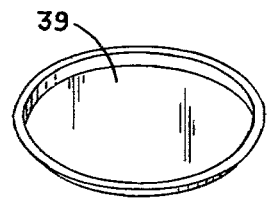
Figure 24:
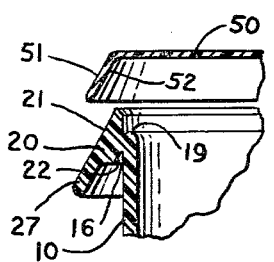
FIG. 24 shows a partial section of an alternative version of the opening part of the container where the ring-shaped elements of the container comprise a shearing element for the container.

FIG. 21 shows an embodiment of the container where the container is arranged with a pouring spout 38 while FIGS. 22–23 show alternative embodiments of lid 39 with a recessed surface and where the lids are arranged with or without gripping element 37.

In FIGS. 24–33 the container 10 is arranged with its ring-shaped element in the form of a shearing element 20 and with the ring-shaped weakening notch 16 situated between the shearing element and the body of the container. The shearing element has a flange 27 which protrudes from the adjacent outer surface of the container body. The flange is movable towards or away from the outer surface of the container. The shearing element has a lower and/or upper ring-shaped surface 22, 23 which faces the outer surface of the container body and forms an angle with it. The respective ring-shaped surface 22, 23 is adjacent to weakening notch 16. Further, the shearing element has a ring-shaped outer surface 21 forming an acute angle with the longitudinal axis of the container. The upper part of the shearing element is situated above the edge 19 which is formed at the mouth of the opened container. Adjacent to the ring-shaped weakening notch 16 a space is consequently formed at the transition between the container body and the shearing element which permits the above-mentioned movement of the shearing element flange 27 in a radial direction in relation to the container.

A lid 50 is arranged with a ring-shaped outer section 51 with its inner surface 52 adapted to the ring-shaped outer surface of the shearing element.

Figure 25A:
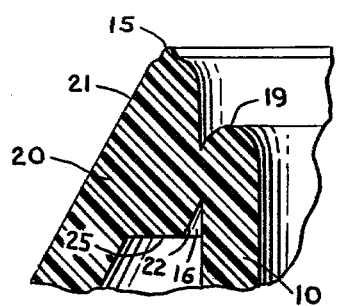
FIGS. 25a and 25b show in detail a partial section as in FIG. 24, FIGS. 26–31 show a lid and a container arranged as in FIG. 24 in the fixed position (FIG. 25), during opening (FIGS. 27–30) and in the reclosed position (FIG. 31)
Figure 25B:
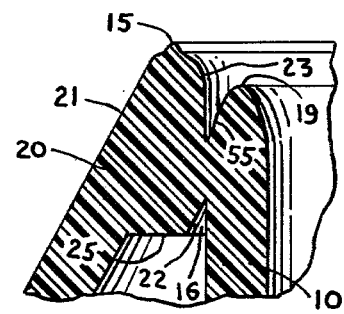

FIG. 25b shows an embodiment of the container where the outer upper edge surface 55 at the edge of the mouth 11 forms a locating surface for guiding the lid 50 to the position for reclosing the container.

Figure 26:
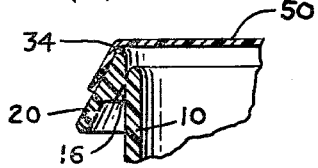

In FIG. 26 the lid 50 is fixed to the shearing element 20 by means of weld joint 34.

Figure 27:
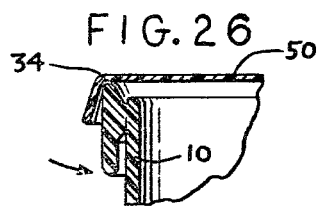
Figure 28:
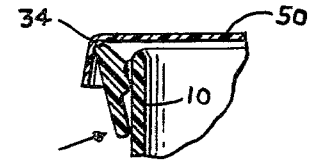

In FIG. 27 the lower part of the shearing element is in the process of moving in a direction towards the container body while in FIG. 28 the lower part has been moved against the container body. Shearing of the joint has already begun in the position shown in FIG. 27 and continues in the position shown in FIG. 28.

In the position shown in FIG. 28 the shearing element acts as a lever and thereby ensures separation of the shearing element from the container body at the ring-shaped weakening notch 16.

Figure 29:
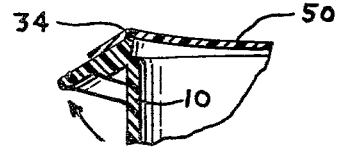
Figure 32:
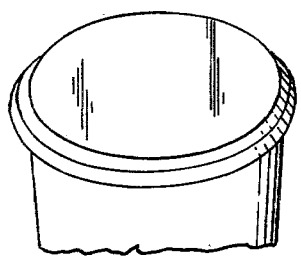
FIGS. 32–33 show embodiments of the container and lid according to the alternative embodiment shown in FIG. 24

In FIG. 29 the lid 50 is removed from the container by moving the shearing element away from the container body. In this embodiment version the edge 19 of the container body and the ring-shaped upper inner surface of the shearing element can also be designed so that the shearing element acts as a lever in connection with opening the container.

Figure 30:
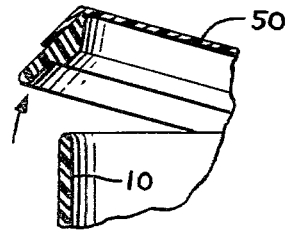
Figure 31:
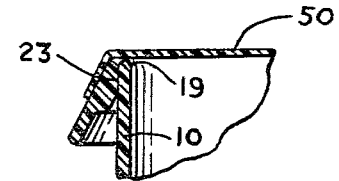

In FIG. 30 the lid 50 is in the process of being lifted away from the container 10 while in FIG. 31 the container has been reclosed. On reclosing, the lid 50 snaps over the edge 19 of the container mouth with the aid of the ring-shaped upper inner surface of the shearing element 23 which consequently fits firmly around the mouth of the container.

Figure 33:
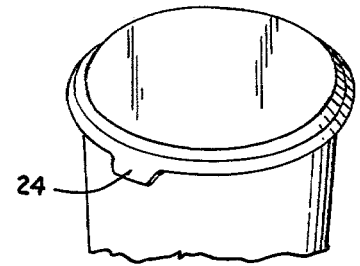

The shearing element 20 can, as is shown in FIG. 33, be arranged with a gripping element 24 to facilitate opening the container, particularly when the container is opened in the manner shown in FIG. 29.

Figure 34:
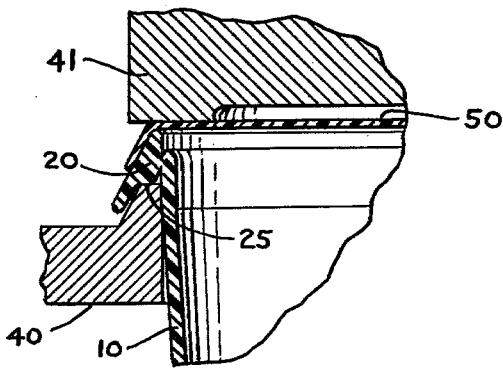
FIG. 34 shows a device in principle for fixing a lid to the container by means of ultrasonics welding and with the container and lid arranged in accordance with the alternative version shown in FIG. 24.

In FIG. 34 holding-up tool 40 is adapted to support a lower ring-shaped surface 25 on the shearing element 20. The sonotrod 41 rests on the upper surface of the lid 50 and the lid and container are welded together in the manner described earlier with reference to FIGS. 8–10.

I claim:

1. The combination of a container and lid in which the lid is removable from the container to open the latter and is replaceable to close the container, said container including a body having a mouth, said mouth including a strip of annular extent secured to said lid, said body of the container being provided with an annular weakening notch in the vicinity of said strip where the mouth of the container is secured to the lid, said container being separable at said notch to separate a part of said container mouth and the lid together with said strip from said body, said notch being positioned radially inwards of said strip and upon rupture of the notch forming separating parts which can be reengaged upon replacement of the lid on said container, and locating surfaces on said lid and container for establishing a determined, oriented position of replacement of the lid on the body of the container.

2. A container with lid as claimed in claim 1, wherein one of said locating surfaces is formed on a cylindrical part of the lid the other locating surface being formed on an upper inside edge of said mouth of the separated container.

3. A container with lid as claimed in claim 1, wherein one of said locating surfaces is arranged in the vinicity of said notch at an upper edge of said mouth and the other locating surface is the inside of the separated part of said separated container.

4. A container with lid as claimed in claim 3, wherein that part of the container intended to be separated when opening the container is movable with respect to said container body to provide a double leverage for rupturing said notch.

5. A container with lid as claimed in claim 1, wherein said strip is formed by at least one weld zone by which the lid is fixed to the container.

* * * * *